United States Patent
Cappa

[11] 3,799,233
[45] Mar. 26, 1974

[54] PNEUMATIC TIRE FOR VEHICLE WHEELS

[75] Inventor: Giulio Cappa, Milan, Italy

[73] Assignee: Industrie Pirelli S.p.A., Milan, Italy

[22] Filed: Sept. 11, 1972

[21] Appl. No.: 287,916

[30] Foreign Application Priority Data
Sept. 29, 1971 Italy.................................. 29250/71

[52] U.S. Cl.............................. 152/361 R, 152/354
[51] Int. Cl............................................. B60c 9/18
[58] Field of Search.......... 152/360, 361 R, 361 FP, 152/361 DM, 354

[56] References Cited
UNITED STATES PATENTS

| | | | |
|---|---|---|---|
| 3,095,026 | 6/1963 | Weber...................... | 152/361 DM |
| 3,500,890 | 3/1970 | Boileau..................... | 152/361 FP |
| 3,598,165 | 8/1971 | Hanus....................... | 152/361 R |

Primary Examiner—Robert G. Sheridan
Assistant Examiner—Robert Saifer
Attorney, Agent, or Firm—Stevens, Davis, Miller & Mosher

[57] ABSTRACT

A pneumatic tire for vehicle wheels composed of a carcass, a breaker structure formed from two superimposed layers of cord fabric made from textiles, metals or glass, and at least one annular element on each shoulder constituted of a rubber compound in which is embedded particles of a material having a modulus of elasticity of at least 5,000 Kg/mm². The particles are oriented with the axis of orientation forming an angle smaller than 10° with tangents to the parallels of the tire. The annular elements are in contact with the lateral edges of the layers of the breaker structure by being positioned between the layers and the carcass, by being composed of two strips one of which is positioned between the layers and one of which is positioned between the layers and the carcass or being composed of two strips of which each is formed into a U-shape and envelops one lateral edge of each breaker layer.

6 Claims, 6 Drawing Figures

PNEUMATIC TIRE FOR VEHICLE WHEELS

The present invention relates to a pneumatic tire for vehicle wheels, which has a high resistance to the tangential forces applied to it by the surface on which it rolls, when the vehicle runs on a curved trajectory.

As is known, when a vehicle runs on a curved trajectory, it is subjected to a centrifugal force which tends to displace it towards the outer side of the curve.

This force is opposed by the adherence of the tread to the ground, so that the tire zones in the immediate proximity of the area of contact are deformed laterally. This initiates at the tread shoulders, compression and tension stresses in the circumferential direction of the tire, which have a value higher than that of the tension to which the tire is subjected due to the inflation pressure.

Various constructional solutions have been adopted to withstand said compression and tension stresses and to reduce the deformations created by them.

According to one solution, the tire shoulders are made with a rubber compound of high hardness, and therefore highly resistant to compression. The tires built up in this way however display considerable stiffness in any direction, and accompanied by the action of the radial forces cause a reduction in the comfort of the tire. In fact, as the total deformability of the tire, produced by radial loads, depends also on the tire shoulders, by reducing the deformability of said parts, the deformability of the tire is reduced also. Moreover, in tires of this design, remarkable heating takes place at their shoulders.

According to another already known solution, the tire is provided with a breaker structure of considerable width, such that its lateral parts are situated in close proximity to the tire shoulders. In this case, the resistance to compression is committed to the lateral parts of the breaker structure.

As is known, the breaker structure is constituted of at least two superimposed layers of cord fabric of textile or metallic material or of glass filaments. In general the cords of the layers are inclined at an angle ranging between 10° and 35° with respect to the equatorial axis of the tire. It is evident that the parts of said layers which are situated in close proximity to the tire shoulders are subjected to compression and tension stresses in the circumferential direction.

It has been ascertained that in pneumatic tires produced with overly wide breakers, failures can take place between the various layers of the breaker structure. Under the action of the compression stresses which are absorbed by the cords of the breaker structure, both the diameter of the cords is increased, and the cords themselves become curly. In fact, it is known that, under the action of the compression stresses, the cords behave at first as helical springs and then, under higher stresses, as solid bodies subjected to a bucking due to their very high length to diameter ratio. This effect reduces considerably the resistance of the cords, giving rise to failures.

Other proposals also have been made, concerning in particular the construction of the lateral parts of the breaker structure. For instance it has been proposed to apply to the parts additional small strips, made of cords, which have a reduced width, or to turn up the lateral skirtings of the breaker layers, or to apply U-shaped strips made of cords so as to join with one another the lateral ends of the cord layers forming the breaker structure.

All of the above indicated solutions, however, are unable to eliminate completely the cited disadvantages, caused by longitudinal compression at the tire shoulders.

The present invention seeks to provide a pneumatic tire for vehicle wheels which comprises a carcass and a breaker structure formed by at least two superimposed layers of cord fabric of textile or metallic material or of glass fibers, which eliminates the above indicated disadvantages.

The tire according to the invention is characterized in that each shoulder of the tire contains at least one annular element constituted of a rubber compound having embedded therein particles of a material having a modulus of elasticity of at least 5,000 Kg/mm², said particles having an elongated shape and being substantially oriented inside the compound, so that the axis of most of them forms an angle smaller than 10° with the tangents to the parallels of the tire.

The present invention will be better understood by way of non-limiting example if reference is made to the attached drawings, in which.

Figure 1:
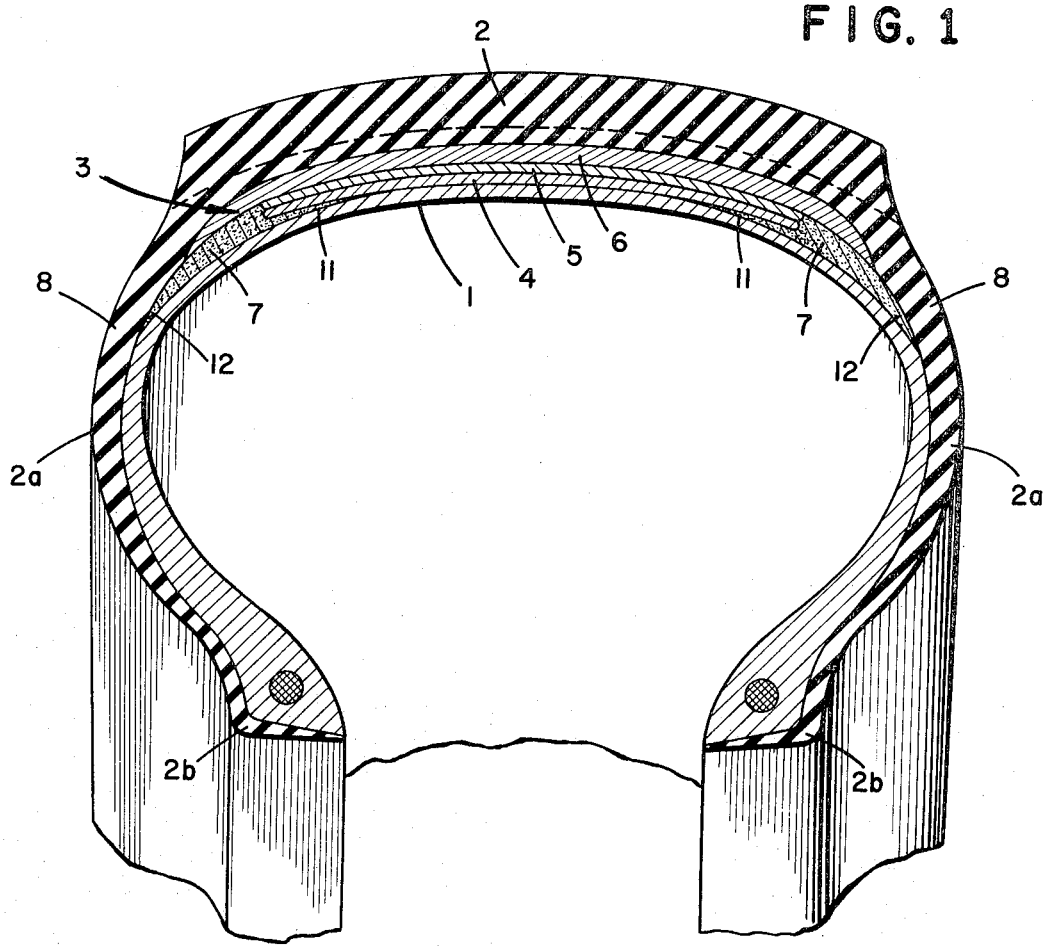
FIG. 1 represents the section of a tire according to the invention, taken along a plane passing through the axis of the tire itself.
Figure 2:
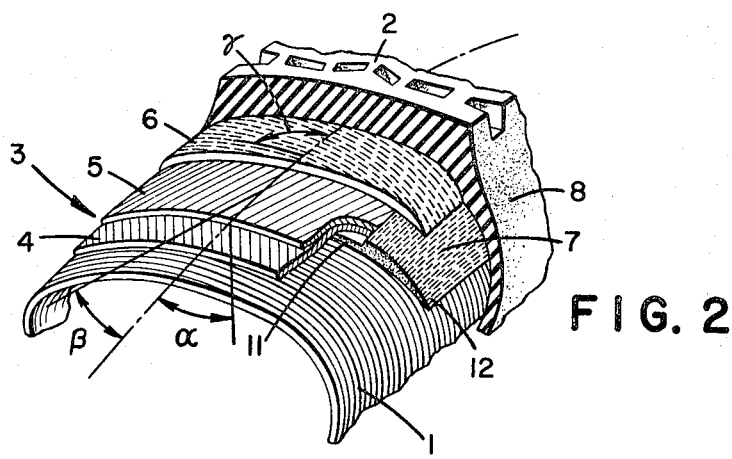
FIG. 2 represents a perspective view of a part of the tire of FIG. 1, showing the inner structure of the tire itself.

With reference to FIGS. 1 and 2, the tire comprises a carcass 1, of the so-called "radial" type in which the cords of the plies constituting it lie substantially in radial planes, a tread 2, sidewalls 2a and beads 2b. A breaker structure 3, substantially comprising a pair of layers 4 and 5 of textile or metallic cords or of cords made of glass fibers, is sandwiched between the tread and the carcass. The cords of each of said layers are substantially parallel, and form angles $\alpha$ and $\beta$ (FIG. 2) having an opposite sign with respect to the equatorial axis of the tire. The angles range between 10° and 30°, preferably between 16° and 22°.

An additional reinforcing layer 6 is arranged outside the breaker structure 3. This layer can be constituted of cord fabric or of a rubber compound having embedded therein particles of fibers of a material having a modulus of elasticity of at least 5,000 Kg/mm². The particles have an elongated shape and are oriented inside the layer itself. Both the axis of the cords and that of the particles form with the tangents to the parallels of the tire an angle $\gamma$ ranging between 60° and 90° and preferably equal to 80°.

A breaker structure comprising a reinforcing layer 6 embedding particles as defined above is described in U.S. Pat. application No. 160,491 filed July 7, 1971 and entitled "Improvements to the Breaker Structures of Radial Tires".

An annular element 7 is arranged outside the carcass 1 and in contact with each lateral part of the breaker structure 3. The element is situated substantially at one shoulder 8 of the tire. The section of each element 7 is such as to show a thickness gradually decreasing from its central part towards its lateral parts 11 and 12, the first of which is inserted between the carcass 1 and the breaker structure 3 and the other between the carcass and the material which covers the shoulder 8 and the sidewalls 2a of the tire.

Each element 7 is substantially constituted of a rubber compound having embedded therein particles of a material having a modulus of elasticity of at least 5,000 Kg/mm². The particles have an elongated shape and are substantially oriented inside the element itself, so that the axis of most of them forms an angle smaller than 10° with the tangents to the parallels of the tire. Conveniently, at least 90 percent of such particles have the above indicated angular relationship.

Therefore it can be seen that, except for the different angular relationship of the particles, the material forming element 7 can be the same as that used for layer 6.

The material is described in U.S. Pat. application Ser. No. 129,613, filed Nov. 10, 1971 and entitled "Reinforcing Element for Flexible Structures, in Particular Pneumatic Tires". As is explained in the application, the material comprises a rubber compound into which are dispersed, in a substantially uniform manner, fibers of a mineral substance, preferably glass, having a tensional modulus of elasticity of at least 5,000 Kg/mm², in an amount by weight ranging between 1 percent and 30 percent with respect to the total weight of the compound. The fibers have diameters and lengths respectively ranging between 2 and 20 microns and between 0.1 and 1 mm.

The above indicated compound is prepared by adding to it, in the above cited amounts, fibers of the above specified material, whose length is not smaller than 100 times their diameter. Subsequently, by means of a mechanical treatment of the compound, the fibers are uniformly dispersed inside it and are broken, in order to obtain fibers of a length smaller than that indicated above, in which the diameter to length ratio is comprised between 1/10 and 1/100. At last, by means of a further mechanical treatment, the compound is converted, usually by extrusion or calendering, into an elongated structural shape, in which most of the fibers are oriented in a direction substantially parallel to the greater dimension of the structural shape itself. By means of the above process, it is possible to obtain semifinished products for the annular elements 7 in which, normally, 90percent of the dispersed fibers forms an angle smaller than 10° with respect to the above direction.

Figure 3:
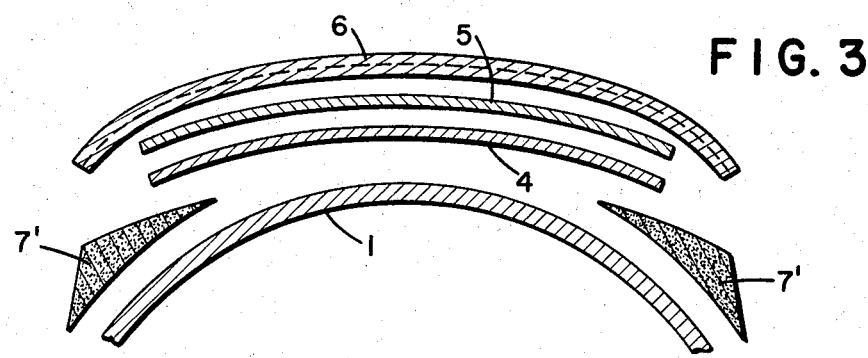
FIG. 3 represents diagrammatically the section of some elements used to build up the tire of FIG. 1, before the application of the tread band of uncured rubber on their radially outer part.

In order to build up the described tire, the carcass 1 (FIG. 3), layers 4 and 5 of the breaker structure 3, reinforcing layer 6 and semi-finished products 7' which form the annular elements 7 in the finished tire, can be arranged in the manner diagrammatically shown in FIG. 3. In FIG. 3, the various parts constituting the finished tire are simply represented as superimposed, and they have not yet, in section, the shape they will take in the finished tire.

A further layer of uncured rubber, not shown, intended to form the tread 2 (FIG. 1), the sidewalls 2a and the beads 2b of the tire, is applied to the structure as shown in FIG. 2.

At the end of the curing operation, to which the so prepared structure is subjected, the tire shown in FIG. 1 is obtained.

In particular, in the finished tire, the reinforcing layer 6 and the annular elements 7 which are substantially constituted as said above, of the same material (with the exception of the different angular relationship for the dispersed particles) form a single unit which encloses the breaker structure 3.

Figure 4:
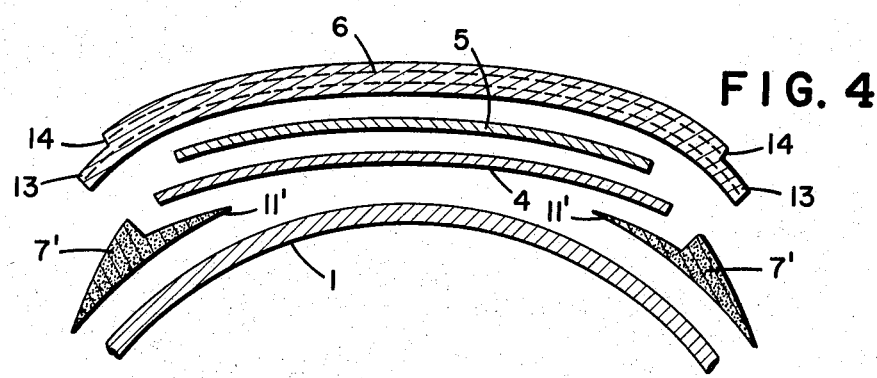
FIGS. 4, 5 and 6 represent diagrammatic sections analogous to those of FIG. 3, which illustrate some elements of alternative structures used to build up the tire of FIG. 1.

According to an alternative arrangement of the structure of FIG. 3, represented in FIG. 4, layers 4 and 5 can have a slightly different width, the width of the upper layer being smaller than that of the lower layer, and the semi-finished products 7' can have terminal parts 11' situated partially below layer 4. Also reinforcing layer 6 can be shaped differently from that represented in FIG. 3. In FIG. 4 the layer shows terminal parts 13, whose thickness is smaller than that of the central parts, and which are suddenly reduced by means of steps 14. It is evident that the parts which constitute the structures illustrated in FIGS. 3 and 4 can be combined with one another in various ways, so as to form structures different from those illustrated and described. Moreover, it is to be understood that each of such structures forms a finished tire which is still substantially of the type represented in FIGS. 1 and 2, although small differences can be noticed in it, both in the position and in the shape of the various component parts.

The material of each annular element 7 of the tire according to the present invention has an elastic behaviour which is different depending on whether the stresses applied to it are contained in a plane passing through the axis of the tire, i.e., the plane of FIG. 1, or are orthogonal to it. In the first case, the deformability of the material constituting the element is high and its resistance to compression is low, while in the second case its deformability is low and its resistance to compression is very high. By virtue of the particles having an elongated shape and oriented substantially in a direction perpendicular to the plane shown in FIG. 1, the resistance and the deformability of the rubber compound, measured in any direction contained in a plane passing through the axis of the tire, are not substantially modified by the presence of said fibers, while such mechanical characteristics are considerably modified in the direction orthogonal to said plane. The particles impart to the material forming the element 7 a substantially high resistance to compression in the direction of orientation of the particles themselves.

It is evident therefore that the radial rigidity of the shoulders 8 of the tire is not appreciably affected by the presence of the elements 7, as the behavior under flexion of said elements, in planes passing through the axis of the tire, is substantially equal to that of a corresponding element made with a rubber compound. It follows that the deformability of the tire according to the invention under the action of radial loads, which, as known, depends considerably on the deformability of the shoulders and of the sidewalls of the tire itself, is not reduced with respect to tires of the same type not provided with the elements 7, permitting in this way to obtain a high degree of travelling comfort.

To the contrary, the elements 7 exercise a favorable influence during the deformation of the tire which takes place when the vehicle travels along a curved trajectory. As a result of the high tangential forces, the tire is subjected to deformation at some parts of its shoulders 8 (FIG. 1). Remarkable compression stresses in circumferential direction are absorbed by the elements 7. The elements 7 increase the resistance of the tire to the tangential forces, and thus prevent the occurrence of ruptures in the tire inside.

Further, the elements 7 allow the use of breakers having a width smaller than that of the conventional ones while ensuring the same lateral rigidity of the tire, or permit increasing the rigidity while utilizing a breaker of conventional width.

The tire shown in FIG. 1 also can be conveniently built up by starting from structures different from those illustrated in FIGS. 3 and 4.

Figure 5:
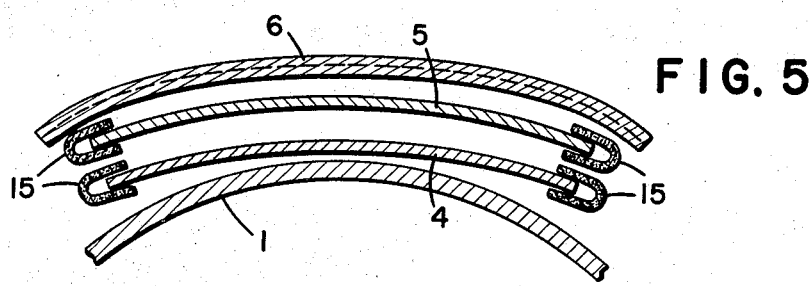

According to the structure shown in FIG. 5, strips 15, made of a material identical to that used for the production of the semi-finished products, can be adopted instead of the semi-finished products 7' (FIGS. 3 and 4). The strips are folded in order to form elements having substantially a U-shape. The edges of each layer 4 and 5 of the breaker structure 3 are inserted between the two arms of the U of each of the folded strips 15, as clearly visible in FIG. 5.

Figure 6:
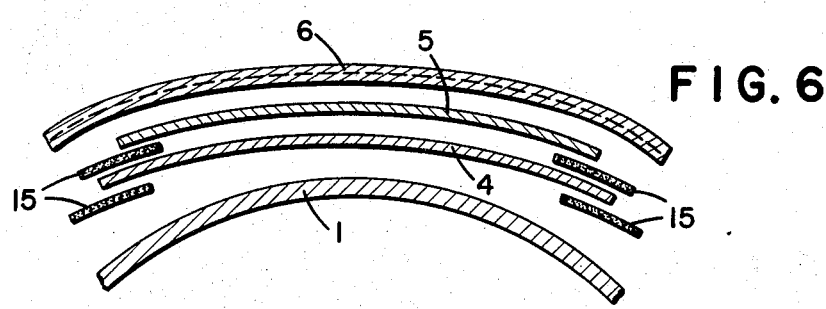

According to the structure of FIG. 6, the strips 15, not folded, are alternatively situated between the layers 4 and 5 of the breaker structure 3.

The tire obtained with a structure of the type of those shown in FIGS. 5 and 6 is slightly different from that of FIG. 1. However, in both cases, the strips 15 locate annular elements 7 (FIG. 1) at each shoulder 8 of the tire which, even if they have a section different from that shown in FIG. 1, behave in a manner identical to that described above.

It is clear that the present invention can be modified or varied, with respect to the shape and the position of the various parts, without being outside of the scope of the invention itself.

What is claimed is:

1. A pneumatic tire for vehicle wheels comprising a carcass and a breaker structure formed by at least two superimposed layers of cords embedded in a rubber compound, wherein each shoulder of the tire contains at least one annular element constituted of a rubber compound having embedded therein particles of a material having a modulus of elasticity of at least 5,000 kg/mm$^2$, said particles having a diameter and length respectively ranging between 2 and 20 microns and between 0.1 and 1 mm, the amount by weight of said particles in the compound ranging between 1 percent and 30 percent with respect to the total weight of the compound, said particles being substantially oriented inside the compound with at least 90 percent of them having their axis forming an angle smaller than 10° with the tangents to the parallels of the tire.

2. The pneumatic tire of claim 1, wherein the oriented particles are made of glass.

3. The pneumatic tire of claim 1, wherein each of said annular elements is partially positioned between said layers of the breaker structure and the tire carcass.

4. The pneumatic tire of claim 1, wherein each of said annular elements is folded in a substantially U-shape, each lateral edge of the breaker being inserted between the two arms of the U of the corresponding annular element.

5. The pneumatic tire of claim 1, wherein each of said annular elements comprises at least one pair of continuous strips, one of the strips of said pair being partially positioned between the two layers of the breaker structure, while the other is arranged between one of said layers and the tire carcass.

6. The pneumatic tire of claim 1, wherein each of said annular elements comprises at least one pair of continuous strips, each strip of said pair of strips being folded in a substantially U-shape and one lateral edge of each of said layers of the breaker structure being inserted between the two arms of the U of a corresponding strip of said pair.

* * * * *